United States Patent Office 3,686,246
Patented Aug. 22, 1972

3,686,246
NICKEL COMPOUNDS
Evelyne Burdet, 193 Avenue de Colmar, 68 Mulhouse, France, and Kurt Hofer, Schonaustr. 24, Munchenstein, Basel-Land, Switzerland
No Drawing. Filed Aug. 10, 1970, Ser. No. 62,659
Claims priority, application Switzerland, Aug. 18, 1969, 12,457/69
Int. Cl. C07f *15/04;* C08f *45/62*
U.S. Cl. 260—439 R         11 Claims

ABSTRACT OF THE DISCLOSURE

New nickel salts of carboxylic acids, containing a thio ether radical, of the formula

[R—S—(CH$_2$)$_p$—COO]$_2$Ni         (I)

where R stands for an alkyl, monoalkylaryl or polyalkylaryl radical which has 4 to 24 carbon atoms, may be interrupted by sulphur atoms and may bear non-water-solubilizing substituents, or for a radical, which may be alkylated, of formula

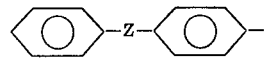

in which Z is oxygen, sulphur or the single linkage, and $p$ stands for 1 or 2.

---

It is known that many organic polymers are subject to ageing through the action of light, heat, atmospheric oxygen and other external agencies. Ageing leads to changes in the mechanical and physical properties of the polymer, which are evident in effects such as brittleness, crack formation, crumbling and hardening.

These ageing effects, particularly those due to the action of light and heat, can be minimized by incorporating stabilizers in the polymer at a stage prior to its conversion into the final product.

The stabilizers known to date have the disadvantage of either providing insufficient protection against changes in the mechanical and physical properties leading to the aforenamed effects, or, if they are satisfactory in this respect, of not giving sufficient protection against yellowing and discoloration.

It has now been found that effective protection against alteration in the mechanical and physical properties can be obtained, with full retention of the initial colour of the polymer, by the incorporation in light- and heat-sensitive polymers of new stabilizers, which have the formula

[R—S—(CH$_2$)$_p$—COO]$_2$Ni         (I)

where R stands for an alkyl, monoalkylaryl or polyalkylaryl radical which has 4 to 24 carbon atoms, may be interrupted by sulphur atoms and may bear non-water-solubilizing substituents, or for a radical, which may be alkylated, of formula

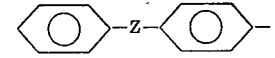

in which Z is oxygen, sulphur or the single linkage, and $p$ stands for 1 or 2.

This invention therefore relates to a process for the production of the new compounds of Formula I, which is characterized in that 1 mole of a nickel compound (II) is reacted with 2 moles of a compound of formula R—S—(CH$_2$)$_p$—COOMe         (III)

Where Me represents a hydrogen atom or a monovalent cation which is replaceable by nickel.

The radicals R may be alkyl radicals which bear 4 to 18 carbon atoms and may be substituted. It is preferable for these radicals to be linear, saturated and unsubstituted and to contain 8 to 18 carbon atoms, but they may be branched or substituted chains, e.g. chains bearing thioether radicals. Monoalkylaryl and polyalkylaryl radicals also are suitable, examples being benzene and naphthalene derivatives which may bear one, two or three alkyl radicals but preferably one only. These alkyl radicals contain preferably 4 to 15 carbon atoms and may be straight or branched, unsaturated or preferably saturated, and they may be substituted in the same way as the aforementioned alkyl radicals. It is preferable for the aryl nuclei to contain no substituents other than the alkyl radicals, though they may bear halogen atoms or thioether radicals.

The radicals of formula

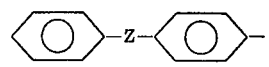

may be unsubstituted or substituted by alkyl radicals bearing 1 to 15 carbon atoms.

The symbol "Me" stands for an equivalent of a cation replaceable by nickel. It is preferably a cation imparting solubility in water to the compound of Formula III, for example hydrogen, ammonium derived from ammonia or an amine, or an alkalimetal such as sodium, potassium or lithium. The amines may be primary, secondary or tertiary amines such as morpholine, pyridine, mono-, di- or trimethylamine, mono-, di- or tri-ethylamine, mono-, di- or tri-butylamine, mono-, di- or tri-ethanolamine, mono, di- or tri-propanolamine or iso-propanolamine. Alternatively "Me" may denote a tetraalkyl-ammonium radical, for example a tetramethyl- or tetraethyl-ammonium radical. These derivatives of ammonia can be prepared by hydrolysis of the corresponding nitriles.

The nickel compounds (II) may be inorganic or organic salts of the metal, e.g. nickel chloride, bromide, nitrate, carbonate, sulphate, acetate or formate.

The reaction is best carried out in solution. Polar solvents are suitable, such as water; alcohols, e.g. methanol, ethanol, iso-propanol, n-butanol, iso-butanol; dioxan; eithers; dimethyl formamide; dimethylacetamide; ethyl acetate; and mixtures of such solvents. It is preferable to work with an aqueous solution or with a mixture of water and a polar solvent such as methanol, dioxan, or dimethyl formamide, or in the absence of water, for example in dimethyl formamide/alcohol or in dioxan/alcohol.

The reaction temperatures may range from 0° C. to the boiling point of the solvent, the optimum temperatures being above 25° C. The pH value of the aqueous or aqueous-organic solution is governed by the nature of the starting products and may vary from the weakly acidic region, e.g. when Me signifies hydrogen, to the moderately alkaline region, depending on the basicity of the cation.

If the starting material is a sodium salt of Formula III, the optimum pH region is 8 to 11 in dependence on the concentration of the solution. It is preferable for both the nickel salt (II) and the compound of Formula III to be in solution when reacted. The reaction can, however, be accomplished with the compound (II) and/or the compound (III) in dispersed form (i.e. in suspension or emulsion), or with a melt of the reactants. Reaction in the melt is a specially suitable mode of operation when the stabilizer is to be incorporated immediately on formation in the thermoplastic polymer at higher temperature, since the addition can be effected without loss of heat through intermediate cooling.

The compounds of Formula III can be prepared directly by formation of the thioether bridge or indirectly via the formation of the corresponding ester or nitrile and subsequent hydrolysis, full or partial as necessary. For the formation of the thioether bridge any of the known methods can be used, e.g. that described by E. Emmet Reid in "The Organic Chemistry of Divalent Sulfur," vol. III, pp. 181–190 (1960), with reference to vol. II, pp. 16–17 and 24–38 of the same publication.

In polar solvents such as water, methanol, iso-propanol and acetone the compounds of Formula I in which R stands for alkyl are insoluble at room temperature, while the alkylaryl derivatives are sparingly soluble.

The new compounds of Formula I are effective for protecting polymers from the effects of ageing, notably from the action of light and heat which commonly acts in the presence of oxygen. They are specially suitable for the protection of polyolefins such as polyethylene, polypropylene and polystyrene, of polyamides such as polyamide 6, 66, 610, 7, 6/66, 11 and 12, and of polyesters such as polyethylene terephthalate and the condensation polymer of terephthalic acid and 1,4 - di-(hydroxymethyl)-cyclohexane. They can be used further to impart protection to acrylic polymers such as polyacrylates, polymethyl methacrylates and polyacrylonitrile, vinyl polymers such as polyvinyl chloride, polyvinyl esters such as polyvinyl acetate, polyvinyl alcohol, cellulosic derivatives such as cellulose diacetate, cellulose triacetate and cellulose triacetate-butyrate, and crosslinked polyurethanes.

In the aforenamed polymers the new nickel compounds inhibit yellowing and discoloration, arrest the development of brittleness and surface cracks and prevent changes in the mechanical properties, as are apt to occur in rubber and rubber-like polymers.

The compounds are applicable as protective additives in thermosetting polymers such as unsaturated polyester resins, where their main function is to impart storage stability to the intermediate products in the period before final processing. The new stabilizers can be employed alone or in synergism with ultra-violet absorbers or other stabilizers, e.g. sterically hindered phenols such as 4-methyl-2,6-di-(tert. butyl)-phenol, phosphites such as triphenyl phosphite, trinonylphenyl phosphite, tridecyl phosphite, tri-iso-decyl phosphite, trilauryl phosphite, diphenyl iso-octyl phosphite and di-iso-decyl pentaerythrite di-phosphite, or the reaction products of a 2- or 4-hydroxy-diphenyl bearing at least one tertiary butyl radical in ortho-position to the hydroxyl group and an agent forming a bridge between phenol molecules, e.g. an aldehyde or a ketone such as formaldehyde, acetaldehyde and acetone or a sulphur monochloride or dichloride, phosphorus trichloride or phosphorus oxichloride (cf. Belgian Pat. 737 632).

It is advantageous to incorporate these stabilizers in the polymer in amounts of 0.01% to 2%, preferably 0.1–1%, prior to manufacture of the final product. They may be added in the cold or, as with thermoplastic materials, at higher temperatures. It has been found that stable complexes can be prepared with the nickel compounds of this invention and the aforenamed phosphites, which are highly suitable as stabilizers.

Following the incorporation of stabilizers of Formula I, the polymers can be processed as desired, for instance as film or sheet, panelling or strip, monofilament or multifilament yarn, or as dispersions or solutions, or they can be converted into moulding materials for extrusion or injection moulded products, knife coating or roller coating compositions. These stabilizers give very good service in polymers which are much exposed to weathering and for which good colour stability and mechanical properties are specified.

In the following examples the parts and percentages are by weight and the temperatures in degrees centigrade.

EXAMPLE 1

(A) Production of sodium n-dodecylthioacetate

In a nitrogen atmosphere 205 parts of 98.5% n-dodecylmercaptan are entered into 190 parts of a 30% aqueous sodium hydroxide solution at room temperature. Subsequently 200 parts of methanol and 300 parts of water are added. The temperature is raised to 50°, on which a solution forms. While the temperature is being raised further to 75–80° 150 parts of sodium monochloracetate are gradually added. The mixture is stirred for 3 hours at the latter temperature. On cooling the reaction product settles out in the form of a white mass, which is filtered, washed with water and dried. The product is 270 parts of sodium n-dodecylthioacetate in the form of a white powder which melts at 199–205°.

(B) Production of nickel n-dodecylthioacetate 270 parts of sodium n-dodecylthioacetate are dissolved in 1900 parts of water at 75–80°; the pH of the solution is 10.0. A solution of 113.3 parts of $NiCl_2 \cdot 6H_2O$ in 950 parts of water is added, which causes immediate precipitation of the nickel salt. After stirring for 2 hours at 75–80° and cooling, the precipitated product is filtered, washed with water and vacuum dried at 70°. The yield is 270 parts of a pale greenish powder which melts at 140–147° (Tottoli) and at 134.7° (Mettler FPE). The found nickel content is 10.1%, which is equal to the calculated content.

The same results are obtained when the procedure of this example is employed with 119 parts of $$(CH_3COO)_2Ni \cdot 4H_2O$$

in place of 113.3 parts of $NiCl_2 \cdot 6H_2O$.

The method described above is particularly suitable for producing compounds of Formula I in which $n$ represents 1.

EXAMPLE 2

(A) Production of n-octylthiopropionic acid

At 50° 240 parts of acrylic acid ethylester containing 1% hydroquinone and 2% sodium hydroxide (relative to the mercaptan) as catalyst are gradually added to 300 parts of 97.5% n-octylmercaptan. The reaction mixture is stirred for 2 hours at 60° and then for 4 hours at 75°, after which the excess acrylic ethylester is distilled off. The product is 431 parts of n-octylthiopropionic ethylester in the form of a yellow-brown liquid, which is saponified and acidified with hydrochloric acid to give the free acid.

The n-octylthiopropionic acid is extracted with ether and the solution evaporated to small volume. The n-octylthiopropionic acid crystallizes from it at room temperature in the form of yellowish white laminae.

(B) Production of nickel n-octylthiopropionate

Sodium n-octylthiopropionate is prepared by reacting 218.4 parts of n-octylthiopropionic acid with 133 parts of 30% aqueous sodium hydroxide solution. It is added to 2000 parts of water at a temperature in the region of 60–70° to give a solution of pH 10.5. To the solution is added slowly a solution of 118.5 parts of $$NiCl_2 \cdot 6H_2O$$

in 1000 parts of water. The nickel salt settles out at once. It is filtered, washed with water and dried. A green granular product is obtained having its melting point at 192–196° (Tottoli) or 188.8° (Mettler FPE). The found nickel content is 11.5%, the calculated content 11.9%.

The method of Example 2 is suitable for producing compounds of Formula I in which $n$ stands for 2.

For the production of nickel salts by the procedures of Examples 1 and 2, the following solvent mixtures can be used in place of water: dioxan/alcohol, dioxan/water, dimethyl formamide/alcohol or dimethyl formamide/water. The alcohol in these mixtures may be, for instance, methanol, ethanol, iso-propanol or butanol. The following table specifies further compounds of Formula I which can be produced by the procedures of Example 1 or 2. The melting points were determined with the Tottoli apparatus or the Kofle instrument (denoted "Kofler"). The procedure for the tabulated Example 10 is analogous to that of Example 2, except that the p-tert. butylphenylthiol is allowed to act directly upon the acrylic acid and the saponification step omitted.

The aforenamed nickel compound can be replaced by 0.1% of the compound of Example 3, which imparts

| Example No. | Compound of Formula I | Melting point (° C.) | Ni percent Calcd. | Ni percent Found | Form | Colour | Production as in Example— |
|---|---|---|---|---|---|---|---|
| 3 | Nickel-n-octylthioacetate | 197–206 | 12.6 | 10.9 | Powder | Very pale blue-green. | 1 |
| 4 | Nickel-n-hexadecylthioacetate | 138–140 | 8.5 | 8.0 | do | do | 1 |
| 5 | Nickel-n-octadecylthioacetate | 127–130 | 7.8 | 7.1 | do | do | 1 |
| 6 | Nickel-p-tert.butylphenylthioacetate | 235–242 | 11.6 | 11.8 | do | Pale green | 1 |
| 7 | Nickel-n-butylthipropionate | 165–185 | 15.4 | 16.5 | do | Green | 2 |
| 8 | Nickel-n-dodecylthiopropionate | 189.3 | 9.7 | 9.4 | do | Pale green | 2 |
| 9 | Nickel-tert.dodecylthiopropionate | ¹134 | 9.9 | 9.7 | Fine granules | Green | 2 |
| 10 | Nickel-p-tert.butylphenylthiopropionate | 137–150 | 11.0 | 9.6 | Powder | do | 2 |

¹ Kofler.

The compounds of Formula I obtained by the procedures of Examples 1(B) and 3 are insoluble. Those of Examples 4 and 5 are sparingly soluble in dioxan and toluene only; in other solvents they are insoluble. Example 6 yields a compound which has low solubility in polar solvents, extremely low solubility in acetic acid ethylester, dioxan, toluene and tetrachloromethane and is insoluble in petroleum benzine. The compounds of Examples 2(B) and 7 to 10 are sparingly soluble in toluene and tetrachloromethane; those of Examples 2(B) and 9 are insoluble in dioxan; those of Examples 7, 8 and 10 are very sparingly soluble in dioxan; those of Examples 7 and 10 are insoluble in petroleum benzine and polar solvents.

Example 11

The procedure follows that of Example 1, except that an n-alkylmercaptan mixture is used with the approximate composition 10% n-octylmercaptan, 10% n-decylmercaptan, 60% n-dodecylmercaptan and 20% n-tetradecylmercaptan. The resulting nickel-n-alkylthioacetate is a green powder which is insoluble in water and in the commonly used solvents such as alcohols, dioxan, toluene, acetic acid ethylester and petroleum benzine.

Example 12

A mixture of 70 parts (0.2 mole) of diphenyl isooctylphosphite and 57.7 parts (0.1 mole) of nickel n-dodecylthioacetate is slowly raised to 120° and maintained at this temperature for 1 hour. On cooling a green, viscous liquid is obtained with a nickel content of 4.6%.

Example 13

At slowly increasing temperature 57.7 parts of nickel n-dodecylthioacetate are entered into 150 parts (0.3 mole) of tridecyl phosphite. The temperature is then raised to 120° and the solution held at 115–120° for 1 hour. On cooling a green liquid is obtained with a nickel content of 2.8%.

Application Example A 100 parts of polypropylene are mixed with 0.5 part of nickel n-dodecylthioacetate. The mixture is injection moulded at 220° in the form of disks of 0.3 mm. thickness. The disks are exposed to the light of a Xenotest 450 apparatus. Those with the incorporated nickel n-dodecylthioacetate show the first sign of brittleness only after 2000 hours but are free from yellowing, whereas the disks containing no stabilizer are brittle after exposure for 800 hours.

Application Example B

In a suitable mixer polyvinyl chloride is blended at 180° with 0.25% of the compound $$\text{Ni-(tert.-}C_{12}H_{25}\text{—S—}CH_2\text{—}CH_2\text{—COO})_2.$$

The mixture is processed on a roller mill in the form of sheets of approximately 1 mm. thickness. After exposure for 4000 hours in the Xenotest apparatus these are quite free from change, whereas a comparable sheet not containing the stabilizer is yellow and cracked after this exposure period.

protection sufficiently effective for the sheet to withstand 5000 hours' exposure without degradation.

The nickel compounds of Examples 2 and 11 also give very good results, while those of Examples 4 and 5, employed in the optimum amounts of 0.5%, stabilize the polyvinyl chloride for at least 5000 hours.

Application Example C

Polypropylene is blended with 0.5% of the nickel compound of Example 8 is a suitable mixer (Gelimat) at 180° and is then injection moulded at 250° in the form of panels of 1 mm. thickness. After a weather resistance test of 350 hours the panels shown no sign of change.

Application Example D

At 180° 0.5% of the nickel compound produced as in Example 1 and 0.2% trinonylphenyl phosphite are incorporated in a batch of polypropylene. The material is converted in sheets of 1 mm. thickness by injection moulding at 230°. After 450 hours of combined light and weathinging exposure the sheets with the nickel compound show no degradation, whereas a comparative sheet without the additive shows hair cracks.

Application Example E 0.2 part of the complex compound obtained by the procedure of Example 12 are incorporated in 100 parts of polyamide 6 on an injection moulding machine at 230°. From this material scapulae of 1 mm. thickness are moulded, which show no alteration after 1000 hours exposure to light in the Xenotest apparatus.

Application Example F

A phosphite of formula $$nC_4H_9\text{—O—P}\left[\text{—O—}\underset{\text{tert.}C_4H_9}{\bigcirc}\text{—}\bigcirc\text{—}(\text{tert.}C_4H_9)\right]_{1.9}$$

is produced by reacting, as in Example 4 of Belgian Pat. 737,632, 1 mole of phosphorus trichloride with 1 mole of n-butyl alcohol and 2 moles of a 4-hydroxy-3-tert. butyl-1.1'-diphenyl bearing an average of two tertiary butyl groups. One mole of this phosphite and 1 mole of the nickel compound formed as in Example 1 are melted and the melt is heated until a complex compound is formed.

0.3 part of this complex compound are incorporated in 100 parts of polyamide using the method of Application Example E. Scapulae of 1 mm. thickness moulded from this material withstand exposure for 1000 hours in the Xenotest apparatus without undergoing change.

Formulae of representative nickel compounds of the foregoing examples are as follows:

Example A $$[n\text{-}C_{12}H_{25}\text{—S—}CH_2\text{—COO}]_2Ni$$

Example 9

$$[\text{tert.-}C_{11}H_{25}\text{—S—}CH_2\text{—}CH_2\text{—COO}]_2Ni$$

Example 10

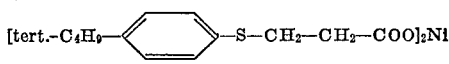

Example 7

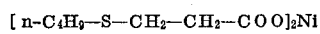

Example 5

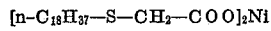

Having thus disclosed the invention what we claim is:

1. A nickel compound of the formula

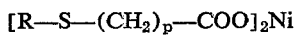

wherein

R is an alkyl radical containing 4 to 24 carbon atoms, an alkylaryl radical containing 7 to 24 carbon atoms and bearing 1 to 3 alkyl groups of 4 to 15 carbon atoms and members of the group consisting of hydrogen, halogen and thioether radicals on the aryl nucleus, or a radical of the formula

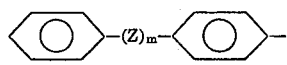

in which Z is oxygen or sulfur and $m$ is 0 or 1, and $p$ is 1 or 2.

2. A nickel compound of the formula

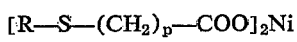

wherein

R is an alkyl or monoalkylphenyl radical which has 4 to 24 carbon atoms; and $p$ is 1 or 2.

3. A nickel compound according to claim 2 wherein R is an alkyl radical of 4 to 18 carbon atoms or a monoalkylphenyl radical of 7 to 18 carbon atoms.

4. A nickel compound according to claim 2 wherein R is a monoalkylphenyl radical in which the alkyl group contains 4 to 15 carbon atoms.

5. Nickel compounds according to claim 2 and of the Formula I where R stands for an alkyl radical which has 8 to 18 carbon atoms.

6. Nickel compounds according to claim 2 and of the Formula I where R stands for an alkyl radical which has 8 to 12 carbon atoms.

7. The nickel compound according to claim 2 and of the formula

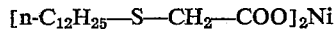

8. The nickel compound according to claim 2 and of the formula

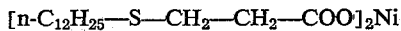

9. The nickel compound according to claim 2 and of the formula

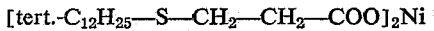

10. The nickel compound according to claim 2 and of the formula

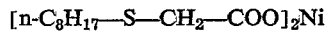

11. The nickel compound according to claim 2 and of the formula

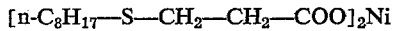

References Cited

UNITED STATES PATENTS

| | | | |
|---|---|---|---|
| 2,877,261 | 3/1959 | Hardy et al. | 260—439 X |
| 3,395,112 | 7/1968 | Kauder | 260—45.75 |
| 3,453,225 | 7/1969 | Pollock | 260—45.75 M |

FOREIGN PATENTS 880,991  11/1961  Great Britain.

OTHER REFERENCES

Irving et al.: J. Phys. Chem. 60 (1956), pp. 1427–9.
Pettit et al.: J. Chem. Soc. (A), 1968, pp. 2009–2012.
Dwyer et al.: Chelating Agents and Metal Chelates, Academic Press, New York, N.Y., 1904, pp. 124–5.

TOBIAS E. LEVOW, Primary Examiner

A. P. DEMERS, Assistant Examiner

U.S. Cl. X.R.

260—45.75 N, 526 S